(12) United States Patent
Nishiguchi et al.

(10) Patent No.: US 8,477,268 B2
(45) Date of Patent: *Jul. 2, 2013

(54) AZO COMPOUND AND SALTS THEREOF, AS WELL AS DYE-BASED POLARIZATION FILMS AND POLARIZING PLATES COMPRISING THE SAME

(75) Inventors: Takuto Nishiguchi, Tokyo (JP); Hiroaki Ohno, Tokyo (JP); Takahiro Higeta, Tokyo (JP); Yuichi Sadamitsu, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 271 days.

This patent is subject to a terminal disclaimer.

(21) Appl. No.: 12/999,447

(22) PCT Filed: May 19, 2009

(86) PCT No.: PCT/JP2009/059172
§ 371 (c)(1),
(2), (4) Date: Dec. 16, 2010

(87) PCT Pub. No.: WO2009/154055
PCT Pub. Date: Dec. 23, 2009

(65) Prior Publication Data
US 2011/0164208 A1  Jul. 7, 2011

(30) Foreign Application Priority Data
Jun. 17, 2008 (JP) .................... 2008-158112

(51) Int. Cl.
G02F 1/1335 (2006.01)
C09B 31/16 (2006.01)
C09B 31/02 (2006.01)
C09B 31/30 (2006.01)
C09B 31/14 (2006.01)
C09K 19/32 (2006.01)

(52) U.S. Cl.
USPC ........ 349/96; 252/299.62; 534/797; 534/806; 534/811; 534/812; 534/815; 534/829; 534/836

(58) Field of Classification Search
USPC ............... 349/96; 252/299.62; 534/797, 806, 534/811, 812, 815, 829, 836
See application file for complete search history.

(56) References Cited

U.S. PATENT DOCUMENTS

| | | |
|---|---|---|
| 2,004,250 A | 6/1935 | Schindhelm et al. |
| 2,270,451 A | 1/1942 | Keller |
| 2,671,775 A | 3/1954 | Hanhart |
| 2,817,659 A | 12/1957 | Bossard et al. |
| 4,051,123 A | 9/1977 | Piller et al. |
| 4,118,232 A | 10/1978 | Piller et al. |
| 4,556,707 A | 12/1985 | Henk |
| 4,954,133 A | 9/1990 | Oppliger |
| 5,007,942 A | 4/1991 | Claussen et al. |
| 5,272,259 A | 12/1993 | Claussen et al. |
| 5,318,856 A | 6/1994 | Misawa et al. |
| 5,446,135 A | 8/1995 | Misawa et al. |
| 5,700,296 A | 12/1997 | Ogino et al. |
| 5,731,421 A | 3/1998 | Tzikas et al. |
| 5,739,298 A | 4/1998 | Misawa et al. |
| 6,049,428 A | 4/2000 | Khan et al. |
| 6,143,062 A | 11/2000 | Miyazawa et al. |
| 6,399,752 B1 | 6/2002 | Ohta et al. |
| 6,552,849 B1 | 4/2003 | Furuhashi et al. |
| 6,563,640 B1 | 5/2003 | Ignatov et al. |

(Continued)

FOREIGN PATENT DOCUMENTS

| | | |
|---|---|---|
| CN | 1220683 A | 6/1999 |
| CN | 1331807 A | 1/2002 |

(Continued)

OTHER PUBLICATIONS

Chinese Communication issued Oct. 31, 2012 in co-pending Chinese Patent Application No. 200980118425.X.

(Continued)

*Primary Examiner* — Joseph Kosack
(74) *Attorney, Agent, or Firm* — Nields, Lemack & Frame, LLC

(57) ABSTRACT

Azo compounds represented by formula (1) (In the formula, $R_1$ represents a lower alkoxy group with a sulfone group. $R_2$-$R_5$ each independently represents a hydrogen atom, lower alkyl group or lower alkoxy group. X is an optionally substituted amino group, optionally substituted benzoylamino group, optionally substituted phenylamino group, optionally substituted phenyl azo group or optionally substituted naphthotriazole group. m represents 1 or 2 and n represents 0 or 1.) and salts thereof.

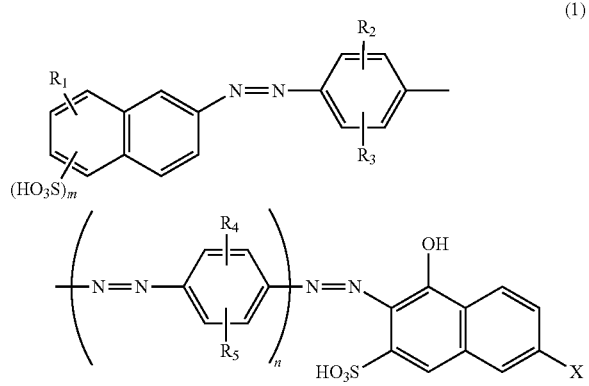

22 Claims, No Drawings

U.S. PATENT DOCUMENTS

| | | | |
|---|---|---|---|
| 6,699,976 B2 | 3/2004 | Ashida et al. | |
| 6,790,490 B1 | 9/2004 | Oiso et al. | |
| 7,245,431 B2 | 7/2007 | Watson et al. | |
| 7,304,147 B2 | 12/2007 | Sadamitsu et al. | |
| 7,387,668 B2 | 6/2008 | Kitayama et al. | |
| 7,445,822 B2 | 11/2008 | Sadamitsu | |
| 7,514,129 B2 | 4/2009 | Sadamitsu | |
| 7,931,702 B2 | 4/2011 | Sadamitsu et al. | |
| 8,232,375 B2 | 7/2012 | Higeta et al. | |
| 2003/0098447 A1 | 5/2003 | Ashida et al. | |
| 2004/0218118 A1 | 11/2004 | Hayashi | |
| 2004/0232394 A1 | 11/2004 | Khan et al. | |
| 2005/0003109 A1 | 1/2005 | Oiso et al. | |
| 2007/0079740 A1 | 4/2007 | Sadamitsu et al. | |
| 2007/0119341 A1 | 5/2007 | Kitayama et al. | |
| 2007/0166483 A1 | 7/2007 | Sadamitsu | |
| 2008/0094549 A1 | 4/2008 | Sadamitsu | |
| 2009/0174942 A1 | 7/2009 | Sadamitsu et al. | |
| 2010/0226008 A1 | 9/2010 | Higeta et al. | |
| 2010/0257678 A1 | 10/2010 | Sadamitsu et al. | |
| 2011/0060134 A1 | 3/2011 | Sadamitsu et al. | |
| 2011/0063546 A1 | 3/2011 | Sadamitsu et al. | |
| 2011/0075076 A1* | 3/2011 | Nishiguchi et al. | 349/96 |
| 2011/0089383 A1 | 4/2011 | Sadamitsu et al. | |
| 2011/0267691 A1 | 11/2011 | Sadamitsu et al. | |

FOREIGN PATENT DOCUMENTS

| | | |
|---|---|---|
| CN | 1523375 A | 8/2004 |
| CN | 1774480 A | 5/2006 |
| CN | 1914283 A | 2/2007 |
| DE | 1644179 B | 7/1971 |
| DE | 3236238 A1 | 5/1984 |
| EP | 0146747 A2 | 7/1985 |
| EP | 0530106 A1 | 3/1993 |
| EP | 0549342 A2 | 6/1993 |
| EP | 0626598 A2 | 11/1994 |
| EP | 0632105 A1 | 1/1995 |
| EP | 0982371 A1 | 3/2000 |
| EP | 1203969 A1 | 5/2002 |
| EP | 1614719 A1 | 1/2006 |
| FR | 1541972 A | 10/1968 |
| GB | 954100 B | 4/1964 |
| JP | 47-018548 B1 | 5/1972 |
| JP | 58-145761 A | 8/1983 |
| JP | 60-115671 A | 6/1985 |
| JP | 60-156759 A | 8/1985 |
| JP | 60-168743 A | 9/1985 |
| JP | 60-243157 A | 12/1985 |
| JP | 60-243176 A | 12/1985 |
| JP | 2-269136 A | 11/1990 |
| JP | 3-12606 A | 1/1991 |
| JP | 5-295281 A | 11/1993 |
| JP | 2622748 B2 | 4/1997 |
| JP | 2001-33627 A | 2/2001 |
| JP | 2001-56412 A | 2/2001 |
| JP | 2001-108828 A | 4/2001 |
| JP | 2001-240762 A | 9/2001 |
| JP | 2002-275381 A | 9/2002 |
| JP | 2003-35819 A | 7/2003 |
| JP | 2003-215338 A | 7/2003 |
| JP | 2004-51645 A | 2/2004 |
| JP | 2004-075719 A | 3/2004 |
| JP | 2004-323712 A | 11/2004 |
| JP | 2004-338876 A | 12/2004 |
| RU | 2110822 C1 | 5/1998 |
| RU | 2155978 C2 | 9/2000 |
| WO | 2004/013232 A1 | 2/2004 |
| WO | 2004/092282 A1 | 10/2004 |
| WO | 2005/033211 A1 | 4/2005 |
| WO | 2005/075572 A1 | 8/2005 |
| WO | 2006/057214 A1 | 6/2006 |
| WO | 2007/145210 A1 | 12/2007 |
| WO | 2007/148757 A1 | 12/2007 |

OTHER PUBLICATIONS

Notice of Allowance mailed Nov. 16, 2012 in co-pending U.S. Appl. No. 12/227,994.
Notice of Allowance mailed Nov. 15, 2012 in co-pending U.S. Appl. No. 13/181,743.
Final Rejection mailed Feb. 8, 2012 in co-pending U.S. Appl. No. 13/181,743.
Final Rejection mailed Feb. 9, 2012 in co-pending U.S. Appl. No. 12/227,994.
Senryo Kagaku (Dye Chemistry), with English Translations, 1st Edition Nov. 20, 1957, 4th Edition Aug. 15, 1966, pp. 618-619, 634-635.
Senryo Kagaku (Dye Chemistry), with English Translations, 1st Edition Nov. 30, 1957, 4th Edition Aug. 15, 1966, p. 626.
Thieme, vol. 10/3, Part 3 (1952), pp. 339-346, XP 002536512, "Methoden der Organischen Chemie", Houben, et al.
J. Chem. Soc. Pak., vol. 24, No. 1, (2002), pp. 10-17, "Stilbene Based Direct Effect of Fixing Agents on the Fastness and Colour Properties", Waheed, et al.
International Search Report dated Jun. 26, 2007 in co-pending foreign application No. PCT/JP2007/060623.
European Communication dated Oct. 12, 2009 in co-pending foreign application No. PCT/JP2007/060623.
Russian Communication dated Feb. 12, 2011 in co-pending foreign application No. RU 2008152360/05.
European Communication dated Jul. 28, 2009 in co-pending foreign application PCT/JP2007/061813.
International Search Report dated Sep. 11, 2007 in co-pending foreign application PCT/JP2007/061813.
European Communication dated Jul. 28, 2009 in co-pending foreign application PCT/JP2007/062509.
European Communication dated May 7, 2010 in co-pending foreign application EP 10151418.0.
Russian Communication dated Nov. 3, 2010 in co-pending foreign application RU 2009101945/05.
Intenational Search Report dated Sep. 11, 2007 in co-pending foreign application PCT/JP2007/062509.
International Search Report dated Dec. 9, 2008 in co-pending foreign application PCT/JP2008/069723.
International Search Report dated Aug. 4, 2009 in co-pending foreign application PCT/JP2009/059173.
Office Action dated Nov. 4, 2010 in co-pending U.S. Appl. No. 12/227,613.
Notice of Allowance dated Dec. 15, 2010 in co-pending U.S. Appl. No. 12/227,613.
Office Action dated Sep. 30, 2010 in co-pending U.S. Appl. No. 12/308,282.
Final Rejection dated Mar. 17, 2011 in co-pending U.S. Appl. No. 12/308,282.
Japanese Communication with English translation, issued Apr. 27, 2012 and mailed May 8, 2012, in co-pending Japanese Patent Application No. JP 2008-517886.
Notice of Allownce mailed Jun. 4, 2012 in co-pending U.S. Appl. No. 12/739,210.
Office Action dated Aug. 11, 2011 in co-pending U.S. Appl. No. 12/227,994.
Office Action dated Aug. 12, 2011 in co-pending U.S. Appl. No. 13/181,743.
EPO Machine Translation of FR 1541972, Farbenfabriken Bayer; Colorants Disazoiques, Oct. 26, 1967.
"Senryo Kagaku (Dye Chemistry)", with English translation, First Edition printing Nov. 30, 1957, Fourth Edition printing Aug. 15, 1966, p. 610-613, 618-619, by Yutaka Hosoda.
International Search Report, dated Aug. 4, 2009 in corresponding foreign application PCT/JP2009/059172.
Chinese Communication, with English translation, issued Nov. 19, 2012 in corresponding Chinese Patent Application No. CN 200980122710.9.
Office Action mailed Dec. 6, 2012 in co-pending U.S. Appl. No. 12/993,643.
English Translation of Chinese Communication issued Oct. 31, 2012 in co-pending Chinese Patent Application No. 20090118425.X.

* cited by examiner

AZO COMPOUND AND SALTS THEREOF, AS WELL AS DYE-BASED POLARIZATION FILMS AND POLARIZING PLATES COMPRISING THE SAME

TECHNICAL FIELD

The present invention relates to novel azo compounds and salts thereof, and dye-based polarizing films and polarizing plates comprising the same.

BACKGROUND ART

A polarizing plate having light transmission/shield function and a liquid crystal having a light switching function are both fundamental components of display devices such as liquid crystal displays (LCD). Application fields of the LCDs have been broadened from the earliest small machineries such as electronic calculators and clocks to note personal computers, word processors, liquid crystal projectors, liquid crystal televisions, car navigation system and interior or exterior-use measurement instrumentation, etc; and use conditions thereof have been widened from low temperature to high temperature, low humidity to high humidity, and low light amount to high light amount. In the circumstances, it has been desired to develop a polarizing plate having high polarization performance and excellent durability.

Currently, a polarizing film is manufactured by allowing iodine or a dichromatic dye to be contained in the polarizing film base such as a stretched/oriented film of a polyvinyl alcohol or a derivative thereof or a polyene-based film, which is formed by producing a polyene by removing hydrochloric acid from a polyvinyl chloride film or by removing water from a polyvinyl alcohol-based film, and orienting the polyene, with iodine or a dichromatic dye serving as a polarizing element. Of these, an iodine-based polarizing film using iodine as a polarizing element is excellent in polarization performance but weak against water and heat, and thus, has a problem in durability when it is used in high temperature/high humidity conditions for a long time. To improve the durability, treatment with formalin or an aqueous solution containing boric acid, and a method where a polymer film having a low water-vapor transmission rate is used as a protecting film have been considered; however, their effects are not always sufficient. On the other hand, a dye-based polarizing film using a dichromatic dye as a polarizing element is excellent in humidity resistance and heat resistance but generally insufficient in polarization performance, compared to the iodine-based polarizing film.

In a neutral color polarizing film formed by allowing a polymer film to adsorb several types of dichromatic dyes and orienting it, if light leakage (color leakage) occurs at a specific wavelength in a visible-light wavelength region in the state where two polarizing films are superimposed such that their orientation directions are crossed orthogonally (orthogonally crossed state), when the polarizing films are installed in a liquid crystal panel, the color tone of a liquid crystal display may sometimes change in a dark state. Then, when polarizing films are installed in a liquid crystal display device, in order to prevent discoloration of the liquid crystal display in a dark state caused by color leakage at a specific wavelength, transmissivity at the orthogonally crossed state (orthogonal-cross transmissivity) within the visible-light wavelength region must be uniformly reduced in a neutral color polarizing film formed by allowing a polymer film to absorb several types of dichromatic dyes and orienting it.

Furthermore, in the case of a color liquid-crystal projection type display, i.e., a color liquid-crystal projector, which uses a polarizing plate in a liquid crystal image forming section, an iodine-based polarizing plate having satisfactory polarization performance and displaying neutral gray has been used in the past. However, as described above, since the iodine-based polarizing plate uses iodine as a polarizing element, light resistance, heat resistance, and moist heat resistance are not sufficient. This is a problem. To overcome this problem, a neutral gray polarizing plate using a dye-based dichromatic pigment as a polarizer has come to be used. However, the neutral gray polarizing plate has the following problem. Since three primary color pigments are generally used in combination in order to uniformly improve the transmissivity and polarization performance within the entire visible-light wavelength region, the light transmissivity is low against the requirement for improving brightness as is the case of a color liquid crystal projector. To improve brightness, the intensity of a light source must be enhanced. To overcome this problem, three polarizing plates corresponding to three primary colors, in other words, for a blue channel, a green channel and a red channel, have come to be used.

However, brightness inevitably reduces for the reason that light is significantly absorbed by the polarizing plate and an image whose size is as small as 0.5 to 3 inches is enlarged to about several tens of inches to several hundreds of inches, and so forth. Therefore, a light source having a high brightness is used. In addition, a desire to further improve the brightness of a liquid crystal projector is still strong. As a result, needless to say, the intensity of a light source in use has more and more increased, and accordingly, light and heat applied to the polarizing plate have increased.

As the dye to be used in manufacturing the dye-based polarizing film as mentioned above, for example, water-soluble azo compounds described, for example, in PATENT DOCUMENT 1 to PATENT DOCUMENT 5, are mentioned.

However, conventional polarizing plates containing the water-soluble dyes as mentioned above have not yet satisfied needs in the market in view of polarization characteristics, absorption wavelength regions and color tone, etc. Furthermore, three polarizing plates corresponding to three primary colors of a color liquid crystal projector, more specifically, polarizing plates for a blue channel, a green channel and a red channel, having satisfactory brightness, polarization performance, durability in high temperature and high humid conditions, and further satisfactory light resistance to long-time exposure have not yet been obtained. Improvement thereof has been desired.

PRIOR ART DOCUMENTS

Patent Document
   PATENT DOCUMENT 1: Japanese Patent No. 2622748
   PATENT DOCUMENT 2: JP 2001-33627 A
   PATENT DOCUMENT 3: JP 2004-51645 A
   PATENT DOCUMENT 4: WO2005/075572
   PATENT DOCUMENT 5: WO2007/148757
   PATENT DOCUMENT 6: JP 2004-075719 A
Non-Patent Document
   NON-PATENT DOCUMENT 1: Dye chemistry; written by Yutaka Hosoda

SUMMARY OF INVENTION

Problems to be Solved by the Invention

An object of the invention is to provide a high-performance polarizing plate having excellent polarization performance, humidity resistance, heat resistance and light resistance. Further, another object of the present invention is to provide a neutral color polarizing plate, in which two or more dichromatic dyes are allowed to be adsorbed to a polymer film and oriented, and which is a high-performance polarizing plate having no color leakage in the orthogonally crossed state in the visible-light wavelength region and having excellent polarization performance, humidity resistance, heat resistance and light resistance.

A further object is to provide a high-performance polarizing plate corresponding to trichromaticity of a color liquid crystal projector satisfactory all in brightness, polarization performance, durability and light resistance.

Means for Solving the Problem

The present inventors have conducted intensive studies with a view to attaining these objects. As a result, they have found that a polarizing film and polarizing plate containing a predetermined azo compound and/or a salt thereof have excellent polarization performance, humidity resistance, heat resistance and light resistance. Based on the finding, the present invention was accomplished.

More specifically, the present invention relates to (1) An azo compound represented by Formula (1) and a salt thereof

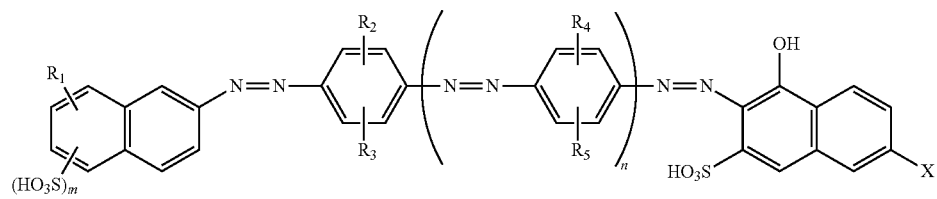

where $R_1$ represents a lower alkoxyl group having a sulfone group, $R_2$ to $R_5$ each independently represent a hydrogen atom, a lower alkyl group, or a lower alkoxyl group, X represents an amino group that may have a substituent, a benzoylamino group that may have a substituent, a phenylamino group that may have a substituent, a phenylazo group that may have a substituent or a naphthotriazole group that may have a substituent, m represents 1 or 2 and n represents 0 or 1;

(2) The azo compound and a salt thereof according to (1), in which X is a benzoylamino group that may have a substituent, a phenylamino group that may have a substituent, a phenylazo group that may have a substituent or a naphthotriazole group that may have a substituent, and these substituents are a hydrogen atom, a lower alkyl group, a lower alkoxyl group, a hydroxyl group, a carboxyl group, a sulfone group, an amino group or a substituted amino group;

(3) The azo compound and a salt thereof according to (1) or (2), in which X is a phenylamino group represented by Formula (2)

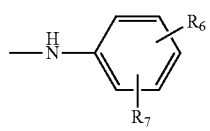

wherein $R_6$ and $R_7$ each independently represent a hydrogen atom, a methyl group, a methoxy group, a sulfone group, an amino group or substituted amino group;

(4) The azo compound and a salt thereof according to (1) or (2), in which X is a benzoylamino group represents by Formula (3)

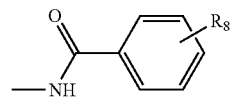

wherein $R_8$ represents a hydrogen atom, a hydroxyl group, an amino group or a substituted amino group;

(5) The azo compound and a salt thereof according to (1) or (2), in which X is a naphthotriazole group represents by Formula (4)

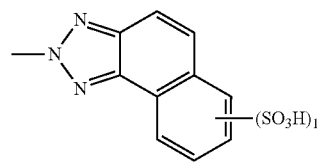

wherein l represents 1 or 2;

(6) The azo compound and a salt thereof according to (1) or (2), in which X is a phenylazo group represented by Formula (5)

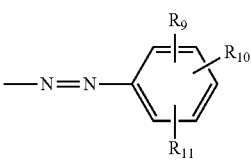

wherein $R_9$ to $R_{11}$ each independently represent a hydrogen atom, a hydroxyl group, a lower alkyl group, a lower alkoxyl group, an amino group or a substituted amino group;

(7) The azo compound and a salt thereof according to any of (1) to (6), in which $R_1$ represents a straight chain lower alkoxyl group having a sulfone group; (8) The azo compound and a salt thereof according to any of (1) to (6), in which $R_1$ represents a sulfopropoxyl group;

(9) The azo compound and a salt thereof according to any of (1) to (8), in which $R_2$ to $R_5$ are each independently a hydrogen atom, a methyl group or a methoxy group;

(10) A dye-based polarizing film comprising a polarizing film base containing an azo compound and/or a salt thereof according to any of (1) to (9);

(11) A dye-based polarizing film comprising a polarizing film base containing an azo compound and/or a salt thereof according to any of (1) to (9), and at least one organic dye other than the azo compound and/or a salt thereof;

(12) A dye-based polarizing film comprising a polarizing film base containing two or more azo compounds and/or salts thereof according to any of (1) to (9), and at least one organic dye other than the azo compound and/or a salt thereof;

(13) The dye-based polarizing film according to any of (10) to (12), in which the polarizing film base is a film comprising a polyvinyl alcohol resin or a derivative thereof;

(14) A dye-based polarizing plate obtainable by attaching a transparent protecting layer to at least one of surfaces of a dye-based polarizing film according to any of (10) to (12);

(15) A polarizing plate for a liquid crystal display using a dye-based polarizing film or a dye-based polarizing plate according to any of (10) to (14);

(16) A color polarizing plate for a liquid crystal projector using a dye-based polarizing film or a dye-based polarizing plate according to any of (10) to (14); and

(17) A liquid crystal display device using a dye-based polarizing plate according to any of (14) to (16).

Advantageous Effects of the Invention

Since a polarizing film containing an azo compound or a salt thereof of the present invention has polarization performance equivalent to a polarizing film using iodine and excellent light resistance, the polarizing film is suitable for use in liquid crystal displays and liquid crystal projectors, and furthermore, for in-vehicle use requiring high polarization performance and durability and display use of industrial measurement instruments used in various environments.

BEST MODE FOR CARRYING OUT THE INVENTION

The azo compound of the present invention is represented by the Formula (1) above. In Formula (1), $R_1$ represents a lower alkoxyl group having a sulfone group (preferably an alkoxyl group having 1 to 5 carbon atoms; hereinafter, the same is applied to the following "lower alkoxyl groups"), $R_2$ to $R_5$ each independently represent a hydrogen atom, a lower alkyl group (preferably an alkyl group having 1 to 5 carbon atoms; hereinafter the same is applied to the following "lower alkyl groups"), or a lower alkoxyl group, X represents an amino group that may have a substituent, a benzoylamino group that may have a substituent, a phenylamino group that may have a substituent, a phenylazo group that may have a substituent or a naphthotriazole group that may have a substituent, m represents 1 or 2 and n represents 0 or 1. $R_1$ represents a lower alkoxyl group having a sulfone group; however, the alkyl chain is preferably a straight chain and particularly preferably either a propoxy group or a butoxy group. $R_2$ to $R_5$ each independently represent a hydrogen atom, a lower alkyl group, a lower alkoxyl group; however preferably a hydrogen atom, a methyl group or a methoxy group. X represents an amino group that may have a substituent, a benzoylamino group that may have a substituent, a phenylamino group that may have a substituent, a phenylazo group that may have a substituent or a naphthotriazole group that may have a substituent. However, in the case where X is a benzoylamino group that may have a substituent, a phenylamino group that may have a substituent or a phenylazo group that may have a substituent, a substituent thereof is preferably a hydrogen atom, a lower alkyl group, a lower alkoxyl group, a hydroxyl group, a carboxyl group, a sulfone group, an amino group or a substituted amino group. In the case where X is a naphthotriazole group that may have a substituent, the substituent thereof is preferably a sulfone group. In the case where X is a phenylamino group that may have a substituent, the substituent thereof is preferably a hydrogen atom, a methyl group, a methoxy group, a sulfone group, an amino group or a substituted amino group. Although a substitution site is not particularly limited, the p-site is particularly preferable. In the case where X is a benzoylamino group having a substituent, the substituent is preferably a hydrogen atom, an amino group, a substituted amino group or a hydroxyl group, and particularly preferably a hydrogen atom or an amino group. In the case where X is a phenylazo group having a substituent, the substituent is preferably a hydrogen atom, a hydroxyl group, a lower alkyl group, a lower alkoxyl group, an amino group or a substituted amino group, and particularly preferably a hydroxyl group.

Next, specific examples of an azo compound represented by the Formula (1) and used in the present invention will be mentioned below. Note that a sulfone group, a carboxyl group and a hydroxy group in the formula are represented in the form of free acid.

(6)

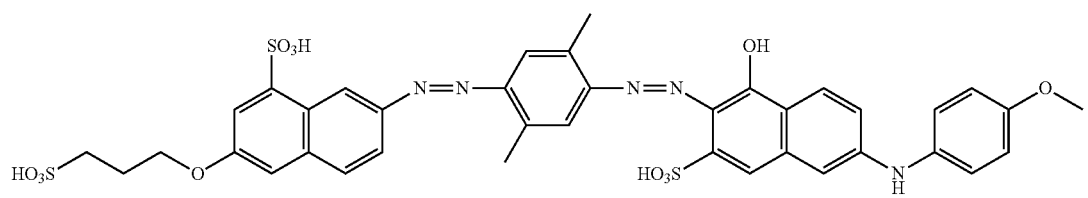

-continued
(7)
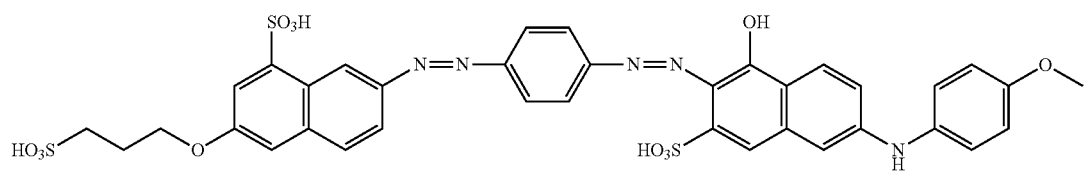
(8)
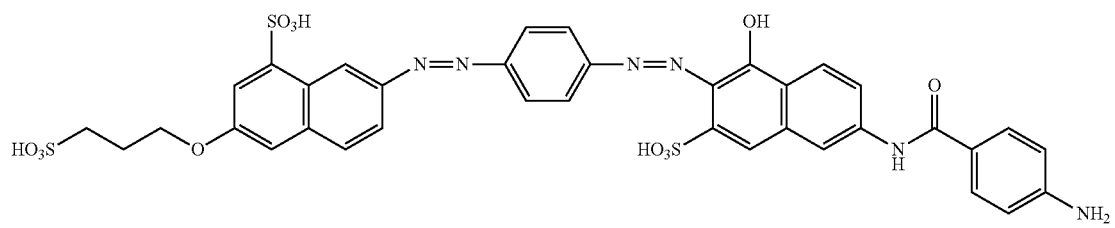
(9)
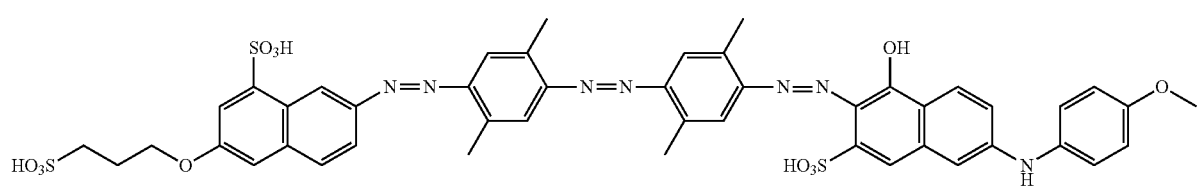
(10)
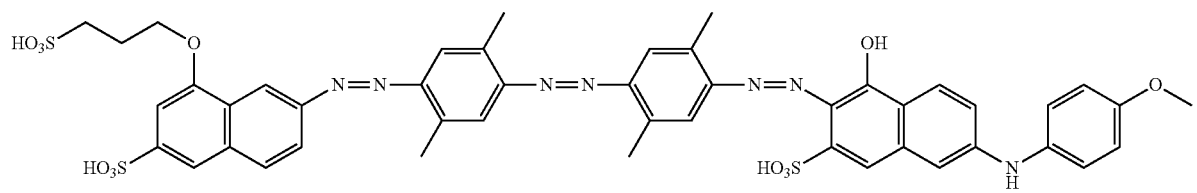
(11)
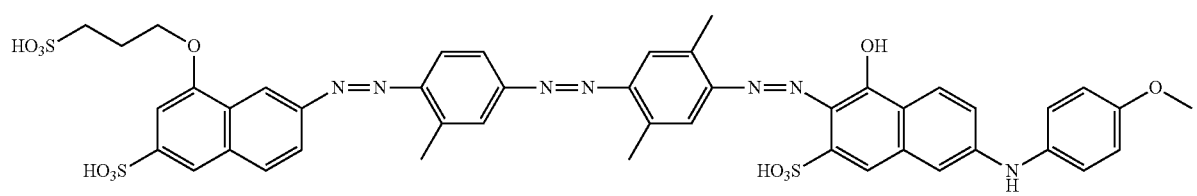
(12)
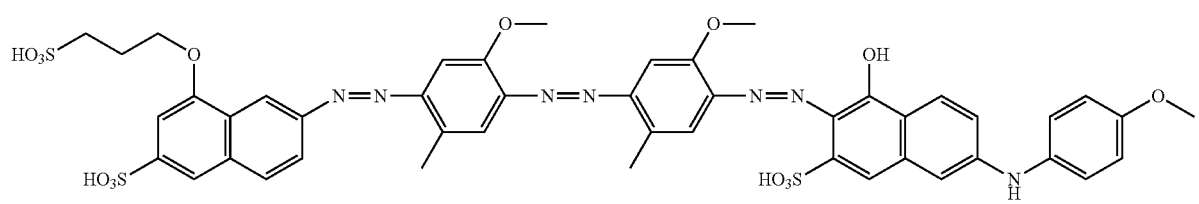
(13)
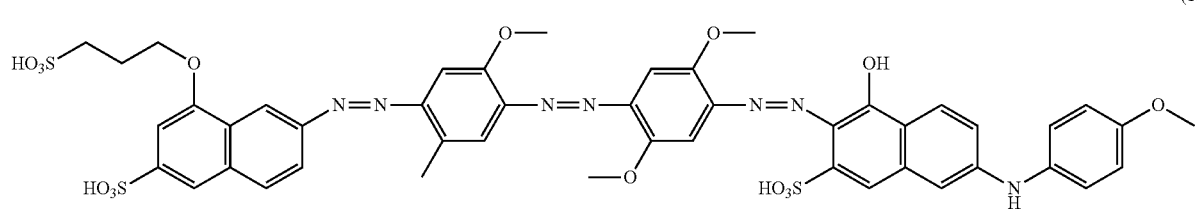

-continued
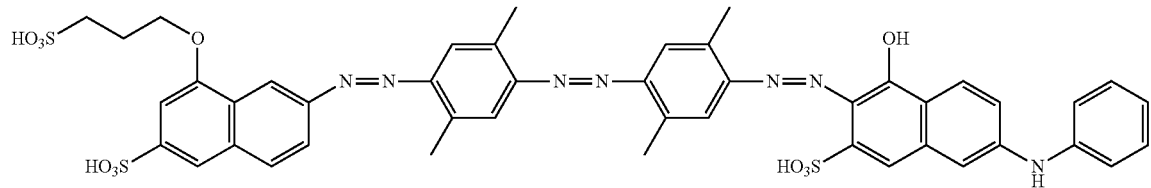
(14)
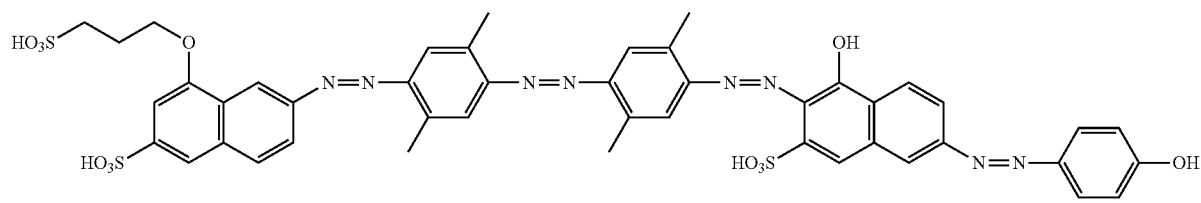
(15)
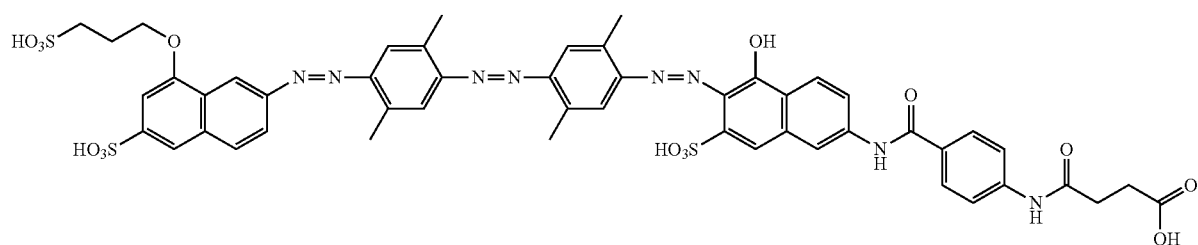
(16)
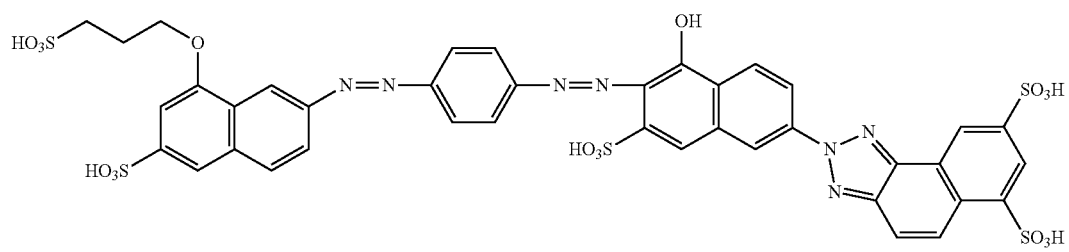
(17)
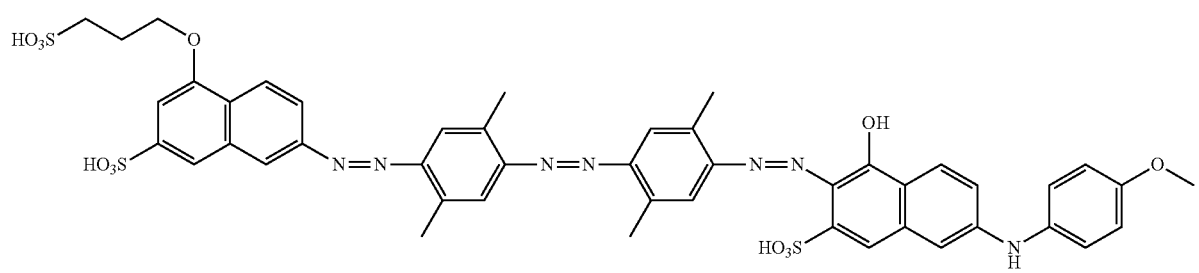
(18)
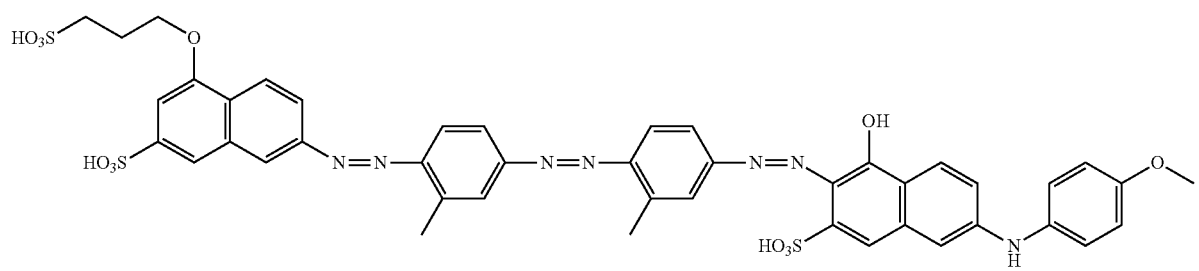
(19)

(20)
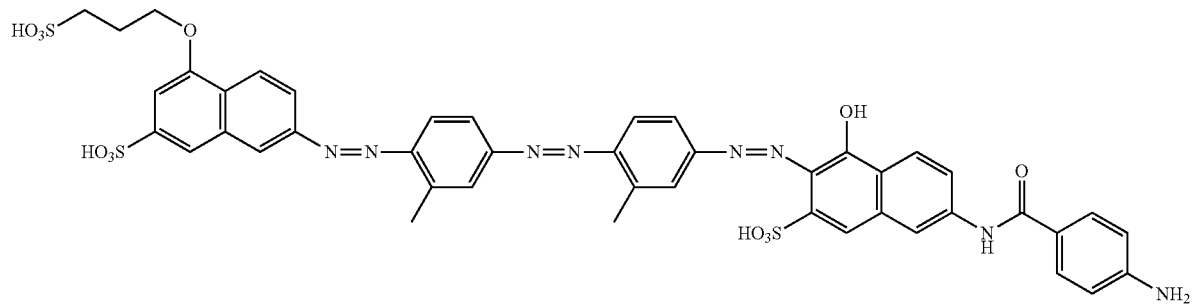
(21)
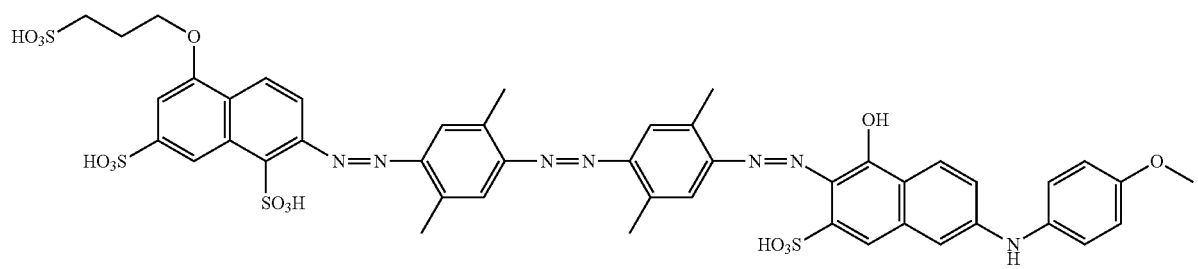
(22)
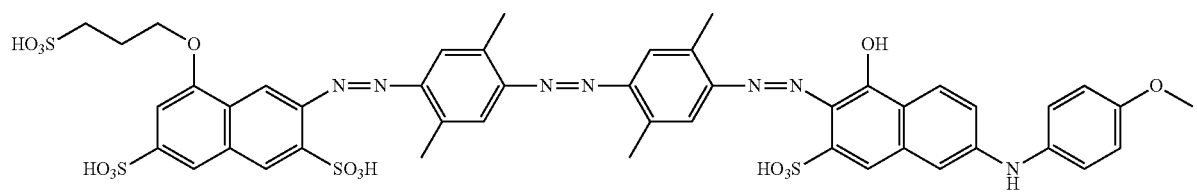
(23)
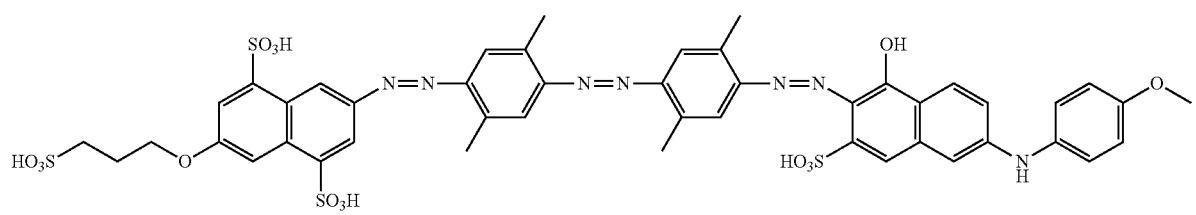
(24)
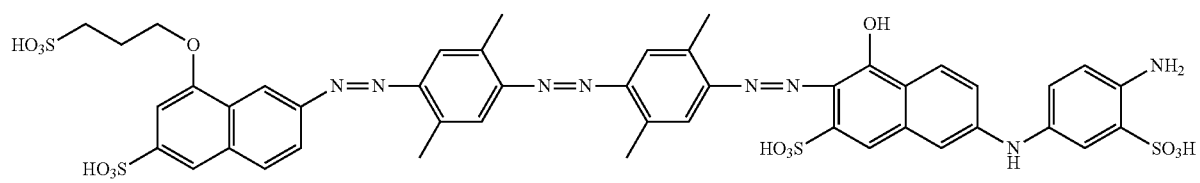
(25)
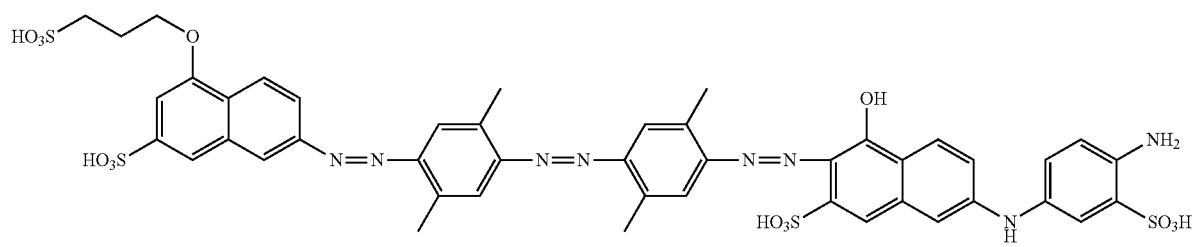

An azo compound represented by Formula (1) or a salt thereof can be easily produced by performing diazotization and coupling known in the art in accordance with a general azo-dye production method as described in NON-PATENT DOCUMENT 1. A specific production method is as follows: A naphthylaminesulfonic acid, more specifically, naphthylaminesulfonic acid represented by Formula (A) below and obtained by alkylsulfonation in accordance with the method shown in Patent Document 6, page 35, is diazotized and subjected to primary coupling with an aniline of Formula (B) below to obtain a monoazoamino compound represented by Formula (C) below.

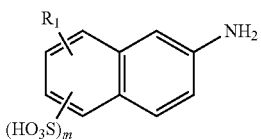
(A)

wherein $R_1$ and m represent the same as $R_1$ and m in Formula (1), respectively.

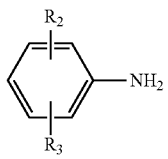
(B)

wherein $R_2$ and $R_3$ represent the same as $R_2$ and $R_3$ in Formula (1), respectively.

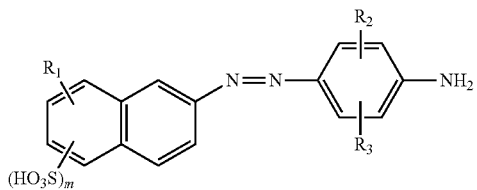
(C)

wherein $R_1$, $R_2$, $R_3$ and m represent the same as $R_1$, $R_2$, $R_3$ and m in Formula (1), respectively.

Next, the monoazoamino compound is diazotized and subjected to secondary coupling with an aniline compound of Formula (D) below to obtain a disazoamino compound represented by Formula (E) below.

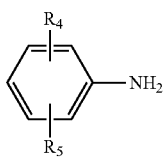
(D)

wherein $R_4$ and $R_5$ represent the same as $R_4$ and $R_5$ in Formula (1), respectively.

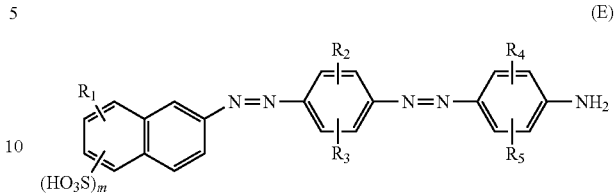
(E)

wherein $R_1$, $R_2$, $R_3$, $R_4$, $R_5$ and m represent the same as $R_1$, $R_2$, $R_3$, $R_4$, $R_5$ and m in Formula (1), respectively.

The disazoamino compound is diazotized and subjected to tertiary coupling with a naphthol represented by Formula (F) below to obtain an azo compound represented by Formula (1).

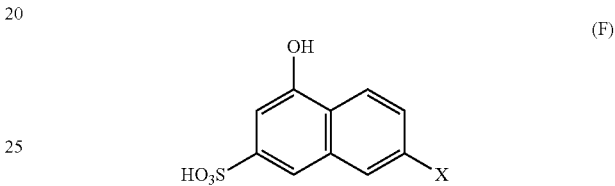
(F)

wherein X represents the same as X in Formula (1).

In the case of n=0 in Formula (1), the Formula (C) is diazotized and subjected to tertiary coupling with a naphthol represented by Formula (F) below to obtain an azo compound of Formula (1).

In the above reaction, a diazotization step is performed by a normal method in which a nitrite such as sodium nitrite is blended with a diazo component dissolved or suspended in an aqueous solution of a mineral acid, such as hydrochloric acid or sulfuric acid, or by a reverse method thereof in which a nitrite is added to a neutral or weak alkaline solution of a diazo component, and this is bended with a mineral acid. The temperature of diazotization is appropriately −10 to 40° C. Furthermore, a step of coupling with an aniline compound is performed by blending an aqueous solution of an acid such as hydrochloric acid or acetic acid with each of the aforementioned diazo solutions and allowed to react at a temperature of −10 to 40° C. in the acidic conditions of pH 2 to 7.

A monoazo compound and a disazo compound obtained by coupling are taken out by directly filtrating or after precipitating them by acid precipitation or salt precipitation, or a solution or a suspension thereof may be directly subjected to a next step. In the case where a diazonium salt is insoluble and forms a suspension, filtration is performed to obtain a press cake, which may be used in a next coupling step.

The tertiary coupling reaction between a diazotized disazoamino compound and a naphthol represented by Formula (F) is performed at a temperature of −10 to 40° C. in neutral to alkaline conditions of pH 7 to 10. After completion of the reaction, a precipitate is obtained by salting out and taken out by filtration. Furthermore, in the case where purification is required, salting out is repeated or precipitation from water with an organic solvent may be performed. Examples of the organic solvent to be used in purification include a water-soluble organic solvent such as an alcohol, e.g., methanol and ethanol and a ketone, e.g., acetone.

Note that, in the present invention, an azo compound represented by Formula (1) is used as a free acid or can be used as a salt of an azo compound. Examples of such a salt include an alkaline metal salt such as a lithium salt, a sodium salt and a potassium salt, an ammonium salt, and an organic salt such as an amine salt. Generally, a sodium salt is used.

Substituent $R_1$ of the naphthylaminesulfonic acid substituted by $R_1$, represented by Formula (A) above, and serving as a starting material for synthesizing a water-soluble dye represented by Formula (1) represents a lower alkoxyl group having a sulfone group, which is more preferably present at the end position of the alkyl group. The lower alkoxyl group herein preferably represents an alkoxyl group having 1 to 4 carbon atoms. In the present invention, a straight chain alkoxyl group is preferable and a 3-sulfopropoxy group or a 4-sulfobutoxy group is further preferable. Reference symbol m is preferably 1 or 2 and the sulfone group may be present on either one of benzene nuclei of the naphthalene rings. Examples of the compound group represented by Formula (A) include 7-amino-3-(3-sulfopropoxy)naphthalene-1-sulfonic acid, 7-amino-3-(4-sulfobutoxy)naphthalene-1-sulfonic acid, 7-amino-4-(3-sulfopropoxy)naphthalene-2-sulfonic acid, 7-amino-4-(4-sulfobutoxy)naphthalene-2-sulfonic acid, 6-amino-4-(3-sulfopropoxy)naphthalene-2-sulfonic acid, 6-amino-4-(4-sulfobutoxy)naphthalene-2-sulfonic acid, 2-amino-5-(3-sulfopropoxy)naphthalene-1,7-disulfonic acid, 6-amino-4-(3-sulfopropoxy)naphthalene-2,7-disulfonic acid and 7-amino-3-(3-sulfopropoxy) naphthalene-1,5-disulfonic acid.

Examples of the substituents of an aniline compound that may have substituents ($R_2$ to $R_5$), which serve as a primary and secondary coupling component, represent a hydrogen atom, a lower alkyl group or a lower alkoxyl group; however a hydrogen atom, a methyl group or a methoxy group are more preferable. These substituents may be bound singly or in combination of two. Examples of the aniline compound include aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline or 3,5-dimethoxyaniline. These aniline compounds may have an amino group protected. As the protecting group, for example, a ω-methanesulfonic acid group is mentioned. The aniline compound to be used in primary coupling and the aniline compound to be used in secondary coupling may be the same or different.

Examples of X of a naphthol having X as a tertiary coupling component include a benzoylamino group that may have a substituent, a phenylamino group that may have a substituent, a phenylazo group that may have a substituent or a naphthotriazole group that may have a substituent. Examples of each of the substituents preferably include a hydrogen atom, a lower alkyl group, a lower alkoxyl group, a hydroxyl group, a carboxyl group, a sulfone group or an amino group that may have a substituent.

In the case where X is a phenylamino group that may have a substituent, X is preferably a phenylamino group having substituents ($R_6$, $R_7$) and represented by Formula (2). The substituents ($R_6$, $R_7$) each independently represent a hydrogen atom, a methyl group, a methoxy group, a sulfone group, an amino group or a substituted amino group; however, more preferably a hydrogen atom, a methyl group, a methoxy group or an amino group. More preferably, at least one of the substituent is present at the p-position relative to the amino group. Examples thereof include a phenylamino group, a 4-methylphenylamino group, a 4-methoxyphenylamino group, a 4-aminophenylamino group, a 4-amino-2-sulfophenylamino group, a 4-amino-3-sulfophenylamino group, a 4-sulfomethylaminophenylamino group or a 4-carboxyethylaminophenylamino group.

In the case where X is a benzoylamino group that may have a substituent, X is preferably a benzoylamino group having a substituent ($R_8$) and represented by Formula (3). The substituent ($R_8$) represents a hydrogen atom, a hydroxyl group, an amino group or a substituted amino group; however preferably represents a hydrogen atom, an amino group or an amino group that may have a substituent. The substitution position is more preferably the p-position. Examples of the benzoylamino group that may have a substituent include a benzoylamino group, a 4-aminobenzoylamino group, a 4-hydroxybenzoylamino group or a 4-carboxyethylaminobenzoylamino group.

In the case where X is a naphthotriazole group that may have a substituent, X is preferably a naphthotriazole group having a sulfone group and represented by Formula (4). Reference symbol l represents 1 or 2 and preferably 2. Examples thereof include a 6,8-disulfonaphthotriazole group, a 7,9-disulfonaphthotriazole group, a 7-sulfonaphthotriazole group or a 5-sulfonaphthotriazole group.

In the case where X is a phenylazo group that may have a substituent, X is preferably a phenylazo group having substituents ($R_9$ to $R_{11}$) and represented by Formula (5). The substituents ($R_9$ to $R_{11}$) each independently represent a hydrogen atom, a hydroxyl group, a lower alkyl group, a lower alkoxyl group, an amino group or a substituted amino group; however, the number of substituents is preferably one. As the substituents, a hydroxyl group, an amino group or a substituted amino group is more preferable. Examples of the phenylazo group that may have a substituent include a 2-methylphenylazo group, a 3-methylphenylazo group, a 2,5-dimethylphenylazo group, a 3-methoxyphenylazo group, a 2-methoxy-5-methylphenylazo group, a 2,5-dimethoxyphenylazo group, a 4-aminophenylazo group, a 4-hydroxyphenylazo group or a 4-carboxy ethylaminophenylazo group; however preferably a 4-aminophenylazo group, a 4-hydroxyphenylazo group or a 4-carboxyethylaminophenylazo group.

In the Formula (1), n represents 0 or 1; however, n is particularly preferably 1.

Furthermore, in the dye-based polarizing film or dye-based polarizing plate of the present invention, the azo compounds represented by Formula (1) or a salt thereof are used singly or in the combination of two or more. Besides this, if necessary, one or more of other organic dyes may be used in combination. The organic dye to be used in combination is not particularly limited; however, preferably a dye having an absorption property in a different wavelength region from the absorption wavelength region of the azo compound or a salt thereof of the present invention and having high dichromatism. Typical examples thereof include C. I. direct yellow 12, C. I. direct yellow 28, C. I. direct yellow 44, C. I. direct orange 26, C. I. direct orange 39, C. I. direct orange 71, C. I. direct orange 107, C. I. direct red 2, C. I. direct red 31, C. I. direct red 79, C. I. direct red 81, C. I. direct red 247, C. I. direct green 80, C. I. direct green 59 and dyes described in PATENT DOCUMENTS 1 to 5. More preferably, dyes developed for a polarizing plate as described in PATENT DOCUMENTS 1 to 5 are more preferably used depending upon the purpose. These pigments are used as a free acid, an alkali metal salt (for example, a Na salt, a K salt, a Li salt), an ammonium salt, and an amine salt.

In the case where another organic dye is used in combination, when needed, the type of dye to be blended differs depending upon the case where a desired polarizing film is a neutral color polarizing film, a color polarizing film for a liquid crystal projector, or other color polarizing films. The blending ratio thereof is not particularly limited; however, generally falls preferably within the range of 0.1 to 10 parts by weight as the total amount of at least one type of organic dye based on the weight of the azo compound of Formula (1) or a salt thereof.

The polarizing film to be used in a dye-based polarizing film or a color polarizing plate for a liquid crystal projector of the present invention can be produced so as to have various types of tones and a neutral color, by adding an azo compound represented by Formula (1) or a salt thereof, if necessary, in combination with another organic dye to a polarizing film material, i.e., a polymer film, by a known method. The resultant polarizing film is used as a polarizing plate by providing a protecting film thereto and is used in liquid crystal projectors, electronic calculators, clocks, note personal computers, word processors, liquid crystal televisions, car navigation system, interior or exterior-use measurement instrumentation, and displays, etc. by providing, if necessary, a protecting layer or an AR (antireflection) layer and a support, etc. thereto.

As the polarizing film base (polymer film) to be used in the dye-based polarizing film of the present invention, a film formed of a polyvinyl alcohol resin or a derivative thereof is preferably used. Specific examples include a polyvinyl alcohol or a derivative thereof, and any of these denatured with an olefin such as ethylene or propylene or an unsaturated carboxylic acid such as crotonic acid, acrylic acid, methacrylic acid, or maleic acid. Of them, a film formed of a polyvinyl alcohol or a derivative thereof is suitably used in view of adsorption property and orientation of a dye. The thickness of a base material is generally 30 to 100 µm, and preferably, about 50 to 80 µm.

When the azo compound of Formula (1) and/or a salt thereof is added to such a polarizing film base (polymer film), a method for dyeing a polymer film is usually employed. Dyeing is, for example, performed as follows. First, the azo compound and/or a salt thereof of the present invention and, if necessary, a dye other than this are dissolved in water to prepare a dye bath. The dye concentration in the dye bath is not particularly limited; however, it is generally selected from the range of about 0.001 to 10 wt %. Furthermore, if necessary, a dyeing auxiliary may be used. For example, salt cake is suitably used in a concentration of about 0.1 to 10 wt %. In the dye bath thus prepared, a polymer film is soaked for 1 to 10 minutes to dye the film. The dyeing temperature is preferably about 40 to 80° C.

The orientation of an azo compound of Formula (1) and/or a salt thereof is performed by stretching the polymer film dyed as mentioned above. As a stretching method, for example, any one of the known methods such as a wet-system method and a dry-system method may be used. The polymer film may be stretched before dyeing as occasion demanded. In this case, orientation of the water-soluble dye is performed during dyeing. To the polymer film having a water-soluble dye contained and oriented, if necessary, a post treatment such as a boric acid treatment is applied by a known method. Such a post treatment is performed in order to improve light-beam transmissivity and polarization degree of the polarizing film. The conditions of the boric-acid treatment vary depending upon the type of polymer film and the type of dye to be used; however, generally the boric acid concentration of an aqueous boric acid solution is set within the range of 0.1 to 15 wt %, preferably, 1 to 10 wt % and the treatment is performed by soaking within the temperature range of 30 to 80° C., and preferably, 40 to 75° C. for 0.5 to 10 minutes. Furthermore, if necessary, a fixing treatment may be performed simultaneously in an aqueous solution containing a cation-based polymer compound.

To one or both surfaces of the dye-based polarizing film of the present invention thus obtained, a transparent protecting film having excellent optical transparency and mechanical strength is attached with an adhesive to form a polarizing plate. Examples of a material used for forming the protecting film include a cellulose acetate-based film and an acrylic film, and further, a fluorine-based film such as that of ethylene tetrafluoride/propylene hexafluoride-based copolymer, and a film formed of a polyester resin, a polyolefin resin or a polyamide based resin, etc. Preferably, a triacetylcellulose (TAC) film and a cycloolefin-based film are used. The thickness of the protecting film is generally 40 to 200 µm.

Examples of the adhesive to be used for attaching the polarizing film and the protecting film include a polyvinyl alcohol-based adhesive, a urethane emulsion-based adhesive, an acrylic adhesive and a polyester-isocyanate-based adhesive. A polyvinyl alcohol-based adhesive is suitable.

To the surface of the dye-based polarizing plate of the present invention, further a transparent protecting layer may be provided. Examples of the protecting layer include an acrylic polysiloxane-based hard coating layer and a urethane-based protecting layer. Furthermore, to further improve a single-plate light transmissivity, an AR layer is preferably provided onto the protecting layer. The AR layer may be formed, for example, by a deposition or sputtering treatment of a substance such as silicon dioxide, titanium oxide, alternatively, by applying a thin coating of a fluorine-based substance. Note that the dye-based polarizing plate of the present invention may be used as an ellipsoid polarizing plate having a phase difference plate attached thereto.

The dye-based polarizing plate of the present invention thus constructed has characteristics in that it has a neutral color, no color leakage in the orthogonally crossed state in the visible-light wavelength region, excellent polarization performance, and further, even in high temperature/high humid conditions, it causes no discoloration, no deterioration of polarization performance and less light leakage in the orthogonally crossed state in the visible-light region.

The color polarizing plate for a liquid crystal projector in the present invention contains, as a dichromatic molecule, an azo compound represented by Formula (1) and/or a salt thereof, and, if necessary, further contains other organic dyes as mentioned above. Furthermore, the polarizing film to be used in the color polarizing plate for a liquid crystal projector of the present invention is also manufactured by the method set forth in the part where the method for manufacturing the dye-based polarizing film of the present invention is described, and further used as the polarizing plate by providing a protecting film thereto, and as a color polarizing plate for a liquid crystal projector by providing, a protecting layer or an AR layer and a support, etc. thereto, when needed.

The color polarizing plate for a liquid crystal projector, in the requisite wavelength region of the polarizing plate (A. when an ultra-high pressure mercury lamp is used; 420 to 500 nm for blue channel, 500 to 580 nm for green channel, 600 to 680 nm for red channel; B. when a trichromaticity LED lamp is used, a peak wavelength for a blue channel: 430 to 450 nm, green channel: 520 to 535 nm, red channel: 620 to 635 nm) has a single-plate average light transmissivity of 39% or more and an average light transmissivity in the orthogonally crossed state of 0.4% or less. More preferably, the polarizing plate has a single-plate average light transmissivity of 41% or more and an average light transmissivity in the orthogonally crossed state of 0.3% or less and more preferably 0.2% or less in the requisite wavelength region of the polarizing plate. Further preferably, the polarizing plate has a single-plate average light transmissivity of 42% or more, an average light transmissivity in the orthogonally crossed state of 0.1% or less in the requisite wavelength region of the polarizing plate. The color polarizing plate for a liquid crystal projector in the present invention has brightness and excellent polarization performance, as described above.

The color polarizing plate for a liquid crystal projector of the present invention is preferably constituted of a polarizing plate composed of a polarizing film and a protecting film and the AR layer provided thereon. In short, a polarizing plate with AR layer, is preferable. Furthermore it is preferable to attach this to a support such as a transparent glass plate, in short, a polarizing plate with an AR layer and a support, is more preferable.

Note that the single-plate average light transmissivity is an average light-beam transmissivity value within a specific wavelength region when natural light is incident upon a single polarizing plate having neither an AR layer nor a support such as a transparent glass provided thereon (hereinafter if a polarizing plate is simply referred to, the same definition is employed). An average light transmissivity in the orthogonally crossed state is an average light-beam transmissivity value within a specific wavelength region when natural light is incident upon two polarizing plates arranged such that the orientation directions thereof are orthogonally crossed.

The color polarizing plate for a liquid crystal projector of the present invention is generally used as a polarizing plate with a support. The support preferably has a planar portion for attaching a polarizing plate. Furthermore, for optical use, a glass molded product is preferable. Examples of the glass molded product include a glass plate, a lens and a prism (for example, a triangle prism, cubic prism). A lens having a polarizing plate attached thereto may be used as a condenser lens provided with a polarizing plate in a liquid crystal projector. Furthermore, a prism attached with a polarizing plate may be used as a polarizing beam splitter with a polarizing plate and a dichromatic prism with a polarizing plate in a liquid crystal projector. Furthermore, the polarizing plate may be attached to a liquid crystal cell. Examples of a material for glass include inorganic-based glass such as soda glass, borosilicate glass and sapphire glass, and organic-based glass such as acryl and polycarbonate; however, inorganic-based glass is preferable. The thickness and size of a glass plate may be desirably set. Furthermore, to the polarizing plate with glass, an AR layer is preferably provided to one or both surfaces of the glass surface or the polarizing plate surface in order to improve a single-plate light transmissivity.

To manufacture the color polarizing plate with a support for a liquid crystal projector, a transparent adhesive (sticker) is applied, for example, to a planer portion of the support, and then, the dye-based polarizing plate of the present invention may be attached to the application surface. Furthermore, a transparent adhesive (sticker) is applied to a polarizing plate, and then, a support may be attached to the application surface. As the adhesive (sticker) used herein, for example, an acrylate-based one is preferable. Note that when the polarizing plate is used as an ellipsoid polarizing plate, adhesion is generally made such that a phase difference plate side faces a support; however, adhesion may be made such that the polarizing plate side may face a glass molded product.

More specifically, in a color liquid crystal projector using the dye-based polarizing plate of the present invention, the dye-based polarizing plate of the present invention is provided on either one or both of the incident side and the emission side of a liquid crystal cell. The polarizing plate may be arranged in contact with a liquid crystal cell or in no contact with it; however, in view of durability, the polarizing plate is preferably in no contact with the liquid crystal cell.

When the polarizing plate is arranged in contact with a liquid crystal cell at the emission side, the dye-based polarizing plate of the present invention using a liquid crystal cell as a support can be used. When the polarizing plate is arranged in no contact with a liquid crystal cell, the dye-based polarizing plate of the present invention using a support except a liquid crystal cell is preferably used. Furthermore, in view of durability, it is preferred to arrange the dye-based polarizing plate of the present invention at both of the incident side and emission side of a liquid crystal cell. Furthermore, the dye-based polarizing plate of the present invention is preferably arranged such that its polarizing plate surface is close to a liquid crystal cell and a support surface is close to a light source. Note that the incident side of a liquid crystal cell refers to a light source side and other side thereof is referred to an emission side.

The color liquid crystal projector using the dye-based polarizing plate of the present invention preferably has a UV ray cut filter arranged between a light source and a polarizing plate provided with a support on the incident side mentioned above. Furthermore, the liquid crystal cell to be used is preferably, for example, an active matrix type, which is formed by enclosing a liquid crystal in a space between a transparent substrate, in which an electrode and TFT are formed, and a transparent substrate, in which an opposite electrode is formed. The light emitted from a light source such as a ultra-high pressure mercury lamp (UHP lamp), a metal halide lamp, or white LED, passes through the UV ray cut filter, separates into three colors, which pass through color polarizing plates provided with supports for blue, green and red channels, respectively, and merge into one, which is enlarged by a projection lens and projected to a screen. Alternatively, a method in which light beams emitted from blue, green, red LEDs, respectively pass through color polarizing plates provided with supports for blue, green and red channels, respectively and merge into one, which is enlarged by a projection lens and projected to a screen is also known.

The color polarizing plate for a liquid crystal projector thus constructed has characteristics in that it has excellent polarization performance and in addition causes no discoloration and no deterioration of polarization performance even in high temperature/high humidity conditions.

EXAMPLES

The present invention will be more specifically explained by way of examples below. These are just examples but would not limit the present invention. In the examples, % and parts are based on weight unless otherwise specified.

Example 1

7-Amino-3-(3-sulfopropoxy)naphthalene-1-sulfonic acid (36.1 parts) was added to water (500 parts), dissolved with sodium hydroxide and cooled. 35% hydrochloric acid (32 parts) was added at 10° C. or less and then, sodium nitrite (6.9 parts) was added and the resultant mixture was stirred at 5 to 10° C. for one hour. To this, a solution containing 2,5-dimethylaniline (12.1 parts) dissolved in a diluted aqueous solution of hydrochloric acid was added and sodium carbonate was added while stirring at 10 to 30° C. to adjust pH to 3. The resultant mixture was further stirred to complete a coupling reaction and filtrated to obtain the monoazo compound (44.3 parts) represented by Formula (26) below.

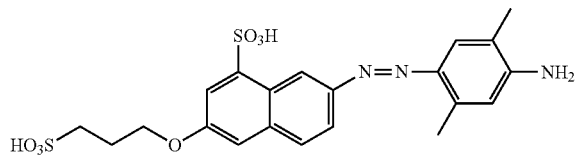

(26)

To the resultant monoazo compound, 35% hydrochloric acid (32 parts), and then, sodium nitrite (6.9 parts) were added and the resultant mixture was stirred at 25 to 30° C. for 2 hours to perform diazotization. On the other hand, 6-(4'-methoxyphenyl)amino-1-naphthol-3-sulfonic acid (31.0 parts) was added to water (200 parts) and dissolved in a weak alkaline condition with sodium carbonate. To this solution, a diazotized monoazo compound previously obtained was poured while maintaining pH 8 to 10, and the resultant mixture was stirred to complete a coupling reaction. Salting out was performed with sodium chloride and filtration was performed to obtain a disazo compound (58.5 parts) represented by Formula (6) above. The maximum absorption wavelength of this compound in a 20% aqueous pyridine solution was 565 nm.

Example 2

7-Amino-3-(3-sulfopropoxy)naphthalene-1-sulfonic acid (36.1 parts) was added to water (500 parts), dissolved with sodium hydroxide and cooled. 35% hydrochloric acid (32 parts) was added at 10° C. or less and then, sodium nitrite (6.9 parts) was added and the resultant mixture was stirred at 5 to 10° C. for one hour. To this, a solution containing sodium anilinomethanesulfonate (20.9 parts) dissolved in water was added and sodium carbonate was added while stirring at 10 to 30° C. to adjust pH to 3. The resultant mixture was further stirred to complete a coupling reaction. Thereafter sodium hydroxide was added to perform hydrolysis at 80° C. and a monoazo compound precipitated was filtrated to obtain the compound (37.2 parts) represented by Formula (27) below.

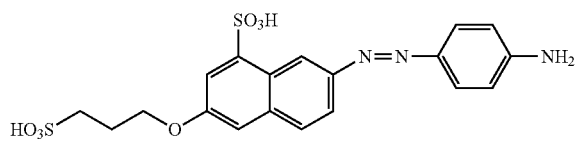

(27)

To the resultant monoazo compound, diazotization, coupling and crystallization were performed in the same manner as in Example 1 to obtain the disazo compound (46.0 parts) represented by Formula (7) above. The maximum absorption wavelength of this compound in a 20% aqueous pyridine solution was 550 nm.

Example 3

6-(4'-Methoxyphenyl)amino-1-naphthol-3-sulfonic acid (31.0 parts) was added to water (200 parts) and rendered to a weak alkaline solution with sodium carbonate. To the solution, the monoazo compound of Formula (27) above was poured in the same manner as in Example 2 while maintaining a diazo compound at pH 8 to 10 and the resultant mixture was stirred to complete a coupling reaction. In the solution, salting out was performed with sodium chloride and filtration was performed to obtain a compound (40 parts) of Formula (8) above. The maximum absorption wavelength of this compound in a 20% aqueous pyridine solution was 534 nm.

Example 4

To the monoazo compound of Formula (26) above, 35% hydrochloric acid (32 parts) was added and then sodium nitrite (6.9 parts) was added and the resultant mixture was stirred at 25 to 30° C. for 2 hours. To this, a solution containing 2,5-dimethylaniline (12.1 parts) dissolved in a diluted aqueous solution of hydrochloric acid was added and sodium carbonate was added while stirring at 20 to 30° C. to adjust pH to 3. The resultant mixture was further stirred to complete a coupling reaction and filtrated to obtain the disazo compound represented by Formula (28) below.

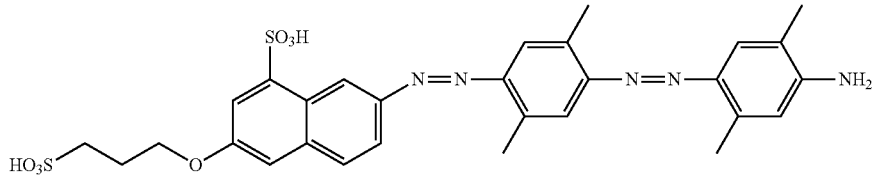

(28)

To the resultant disazo compound, 35% hydrochloric acid (32 parts), and then, sodium nitrite (6.9 parts) were added and stirred at 25 to 30° C. for 2 hours to perform diazotization. On the other hand, 6-(4'-methoxyphenyl)amino-1-naphthol-3-sulfonic acid (27.5 parts) was added to water (200 parts), dissolved in a weak alkaline condition with sodium carbonate. To this solution, a diazotized disazo compound previously obtained was poured while maintaining pH 8 to 10, and the resultant mixture was stirred to complete a coupling reaction. Salting out was performed with sodium chloride and filtration was performed to obtain a trisazo compound (40 parts) represented by Formula (9) above. The maximum absorption wavelength of this compound in a 20% aqueous pyridine solution was 576 nm.

Example 5

The trisazo compound (40 parts) represented by Formula (10) above was obtained in the same manner as in Example 4 except that 6-amino-4-(3-sulfopropoxy)naphthalene-2-sulfonic acid (36.1 parts) was used in place of the starting material, 7-amino-3-(3-sulfopropoxy)naphthalene-1-sulfonic acid (36.1 parts) of Formula (9) above. The maximum absorption wavelength of this compound in a 20% aqueous pyridine solution was 576 nm.

Example 6

The trisazo compound (35 parts) represented by Formula (11) above was obtained in the same manner as in Example 4 except that the primary coupler of Formula (10) above was changed from 2,5-dimethylaniline (12.1 parts) to 3-methylaniline (10.7 parts). The maximum absorption wavelength of this compound in a 20% aqueous pyridine solution was 577 nm.

Example 7

The trisazo compound (42 parts) represented by Formula (12) above was obtained in the same manner as in Example 4 except that the primary coupler and the secondary coupler of Formula (10) above were each changed from 2,5-dimethylaniline (12.1 parts) to 2-methoxy-5-methylaniline (13.7 parts). The maximum absorption wavelength of this compound in a 20% aqueous pyridine solution was 603 nm.

Example 8

The trisazo compound (36 parts) represented by Formula (13) above was obtained in the same manner as in Example 4 except that the secondary coupler of Formula (12) above was changed from 2-methoxy-5-methylaniline (13.7 parts) to 2,5-dimethoxyaniline (15.3 parts). The maximum absorption wavelength of this compound in a 20% aqueous pyridine solution was 622 nm.

Example 9

The trisazo compound (37 parts) represented by Formula (14) above was obtained in the same manner as in Example 4 except that 6-phenylamino-1-naphthol-3-sulfonic acid (25.1 parts) was used in place of 6-(4'-methoxyphenyl)amino-1-naphthol-3-sulfonic acid (27.5 parts) of Formula (10) above. The maximum absorption wavelength of this compound in a 20% aqueous pyridine solution was 573 nm.

Example 10

The trisazo compound (37 parts) represented by Formula (15) above was obtained in the same manner as in Example 4 except that 6-(4'-hydroxyphenylazo)-3-sulfo-1-naphthol (34.8 parts) was used in place of 6-(4'-methoxyphenyl)amino-1-naphthol-3-sulfonic acid (27.5 parts) of Formula (10) above. The maximum absorption wavelength of this compound in a 20% aqueous pyridine solution was 576 nm.

Example 11

The trisazo compound (40 parts) represented by Formula (16) above was obtained in the same manner as in Example 4 except that a naphthol (36.3 parts) represented by Formula (29) below was used in place of 6-(4'-methoxyphenyl)amino-1-naphthol-3-sulfonic acid (27.5 parts) of Formula (10) above. The maximum absorption wavelength of this compound in a 20% aqueous pyridine solution was 543 nm.

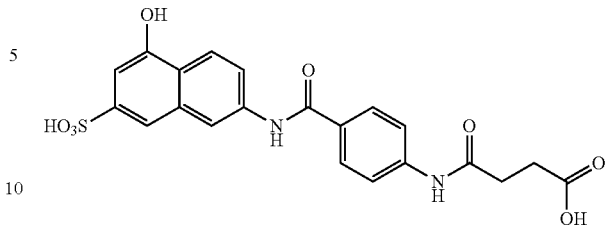

(29)

Example 12

The disazo compound (48 parts) represented by Formula (17) above was obtained in the same manner as in Example 2 except that 6-amino-4-(3-sulfopropoxy)naphthalene-2-sulfonic acid (36.1 parts) was used in place of the starting material, 7-amino-3-(3-sulfopropoxy)naphthalene-1-sulfonic acid (36.1 parts) of Formula (7) above and a naphthol (44.1 parts) represented by Formula (28) above was used in place of 6-(4'-methoxyphenyl)amino-1-naphthol-3-sulfonic acid (31.0 parts). The maximum absorption wavelength of this compound in a 20% aqueous pyridine solution was 541 nm.

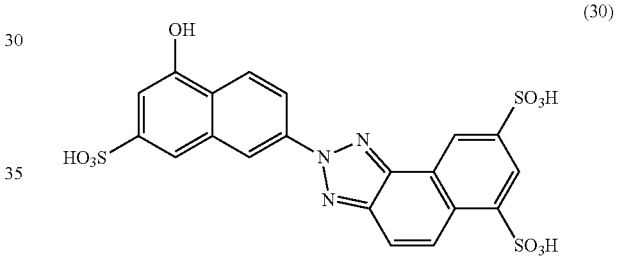

(30)

Example 13

The trisazo compound (40 parts) represented by Formula (18) above was obtained in the same manner as in Example 4 except that 7-amino-4-(3-sulfopropoxy)naphthalene-2-sulfonic acid (36.1 parts) was used in place of the starting material, 7-amino-3-(3-sulfopropoxy)naphthalene-1-sulfonic acid (36.1 parts) of Formula (9) above. The maximum absorption wavelength of this compound in a 20% aqueous pyridine solution was 575 nm.

Example 14

The trisazo compound (35 parts) represented by Formula (19) above was obtained in the same manner as in Example 4 except that the primary coupler and the secondary coupler of Formula (18) above were each changed from 2,5-dimethylaniline (12.1 parts) to 3-methylaniline (10.7 parts). The maximum absorption wavelength of this compound in a 20% aqueous pyridine solution was 564 nm.

Example 15

The disazo compound (32 parts) represented by Formula (20) above was obtained in the same manner as in Example 4 except that 6-(4'-aminobenzoyl)amino-1-naphthol-3-sulfonic acid (28.7 parts) was used in place of 6-(4'-methoxyphenylamino)-1-naphthol-3-sulfonic acid (27.5 parts) of Formula (18) above. The maximum absorption wavelength of this compound in a 20% aqueous pyridine solution was 546 nm.

Example 16

The trisazo compound (38 parts) represented by Formula (21) above was obtained in the same manner as in Example 4 except that 2-amino-5-(3-sulfopropoxy)naphthalene-1,7-disulfonic acid (44.1 parts) was used in place of the starting material, 7-amino-3-(3-sulfopropoxy)naphthalene-1-sulfonic acid (36.1 parts) of Formula (9) above. The maximum absorption wavelength of this compound in a 20% aqueous pyridine solution was 572 nm.

Example 17

The trisazo compound (37 parts) represented by Formula (22) above was obtained in the same manner as in Example 4 except that 3-amino-5-(3-sulfopropoxy)naphthalene-2,7-disulfonic acid (44.1 parts) was used in place of the starting material, 7-amino-3-(3-sulfopropoxy)naphthalene-1-sulfonic acid (36.1 parts) of Formula (9) above. The maximum absorption wavelength of this compound in a 20% aqueous pyridine solution was 573 nm.

Example 18

The trisazo compound (38 parts) represented by Formula (23) above was obtained in the same manner as in Example 4 except that 3-amino-7-(3-sulfopropoxy)naphthalene-1,5-disulfonic acid (44.1 parts) was used in place of the starting material, 7-amino-3-(3-sulfopropoxy)naphthalene-1-sulfonic acid (36.1 parts) of Formula (9) above. The maximum absorption wavelength of this compound in a 20% aqueous pyridine solution was 576 nm.

Example 19

The trisazo compound (42 parts) represented by Formula (24) above was obtained in the same manner as in Example 4 except that 6-(4'-amino-3'-sulfophenylamino)-1-naphthol-3-sulfonic acid (32.8 parts) was used in place of 6-(4'-methoxyphenylamino)-1-naphthol-3-sulfonic acid (27.5 parts) of Formula (10) above. The maximum absorption wavelength of this compound in a 20% aqueous pyridine solution was 579 nm.

Example 20

The trisazo compound (38 parts) represented by Formula (25) above was obtained in the same manner as in Example 4 except that 6-(4'-amino-3'-sulfophenylamino)-1-naphthol-3-sulfonic acid (32.8 parts) was used in place of 6-(4'-methoxyphenylamino)-1-naphthol-3-sulfonic acid (27.5 parts) of Formula (18) above. The maximum absorption wavelength of this compound in a 20% aqueous pyridine solution was 578 nm.

Example 21

In an aqueous solution (45° C.) containing the dye (concentration: 0.03%) of the compound (6) obtained in Example 1 and salt cake (concentration: 0.1%), a polyvinyl alcohol having a thickness of 75 μm was soaked for 4 minutes. This film was stretched to 5 fold in a 3% aqueous boric acid solution at 50° C. While keeping tense, the film was washed with water and dried to obtain a polarizing film.

The maximum absorption wavelength of the resultant polarizing film was 578 nm, and a polarization rate was as high as 99.9%.

Examples 22 to 38

Polarizing films were obtained in the same manner as in Example 21 using azo compounds described in Example 2 to 10 and 13 to 20 similarly to the compound (6). The maximum absorption wavelengths and polarization rates of the resultant polarizing films are shown in Table 1. As shown in Table 1, the polarizing films formed by using these compounds had high polarization rates.

TABLE 1

| Example | Salt of azo compound | Maximum absorption wavelength (nm) | Polarization rate (%) |
|---|---|---|---|
| 21 | Compound of Formula (6) | 578 | 99.9 |
| 22 | Compound of Formula (7) | 561 | 99.9 |
| 23 | Compound of Formula (8) | 532 | 99.9 |
| 24 | Compound of Formula (9) | 587 | 99.9 |
| 25 | Compound of Formula (10) | 587 | 99.9 |
| 26 | Compound of Formula (11) | 589 | 99.9 |
| 27 | Compound of Formula (12) | 617 | 99.9 |
| 28 | Compound of Formula (13) | 639 | 99.9 |
| 29 | Compound of Formula (14) | 575 | 99.9 |
| 30 | Compound of Formula (15) | 594 | 99.9 |
| 31 | Compound of Formula (18) | 587 | 99.9 |
| 32 | Compound of Formula (19) | 574 | 99.9 |
| 33 | Compound of Formula (20) | 544 | 99.9 |
| 34 | Compound of Formula (21) | 581 | 99.9 |
| 35 | Compound of Formula (22) | 586 | 99.9 |
| 36 | Compound of Formula (23) | 588 | 99.9 |
| 37 | Compound of Formula (24) | 585 | 99.9 |
| 38 | Compound of Formula (25) | 586 | 99.9 |

Example 39

On the both surfaces of each of the polarizing films obtained in Example 24, a triacetylcellulose film (TAC film; manufactured by Fuji Photo Film Co., Ltd; trade name TD-80U) was laminated via an aqueous polyvinyl alcohol solution serving as an adhesive and attached to glass by use of a sticker to obtain a polarizing plate. The polarizing plate was irradiated with light by an acceleration xenon arc tester (SX-75 manufactured by Suga Seiki) for 173 hours and a change of polarization rate before and after light irradiation was measured. A change rate of polarization rate was calculated by {(polarization rate before irradiation)−(polarization rate after irradiation)}/(polarization rate before irradiation).

As a result, it was 1.6%, exhibiting excellent durability.

Examples 40 to 45

Using polarizing films obtained in Examples 22, 31, 34, 35, 37 and 38, polarizing plates were formed in the same manner as in Example 39. A change of polarization rate before and after light irradiation was measured. As a result, change rates were, exhibiting excellent durability as in Table 2.

TABLE 2

| Example | Polarizing film | Change rate of polarization rate (%) |
|---|---|---|
| 39 | Polarizing film of Example 24 | 1.6% |
| 40 | Polarizing film of Example 22 | 1.4% |
| 41 | Polarizing film of Example 31 | 1.6% |
| 42 | Polarizing film of Example 34 | 0.4% |
| 43 | Polarizing film of Example 35 | 0.8% |
| 44 | Polarizing film of Example 37 | 0.3% |
| 45 | Polarizing film of Example 38 | 0.2% |
| Comparative Example | Polarizing film of Comparative Example 1 | 6.4% |

Comparative Example 1

The same process was repeated using the compound of Example 13 of PATENT DOCUMENT 5 in place of the compound of Example 1 to obtain a polarizing film, which was laminated in the same manner as in Example 33. Light was applied by an acceleration xenon arc tester (SX-75 manufactured by Suga Seiki) for 173 hours. A change of polarization degree before and after light application was 6.4%. Durability was one-third or less than that of the compound of the Example.

Example 46

A polarizing film was formed in the same manner as in Example 12 except that the compound (9) obtained in Example 4 and an aqueous solution (45° C.) containing a dye (concentration: 0.2%), C. I. direct orange 39 (concentration: 0.07%), C. I. direct red 81 (concentration: 0.02%) and salt cake (concentration: 0.1%) were used. The resultant polarizing film had a maximum absorption wavelength of 555 nm and a single-pate average transmissivity at 530 to 570 nm of 42%, an average light transmissivity in the orthogonally crossed state of 0.02% and a high polarization degree. To the polarizing film, attachment was performed in the same manner as in Example 12 to obtain the polarizing plate (liquid crystal projector for green channel) of the present invention provided with an AR support. The polarizing plate of this example had a high polarization rate and durability even in high temperature and high humid conditions for a long time. In addition, the polarizing plate was excellent in light resistance against long-time exposure.

Industrial Applicability

The azo compound of the present invention and a salt thereof can be suitably used as a raw material for a polarizing plate.

The invention claimed is:

1. An azo compound represented by Formula (1) and a salt thereof

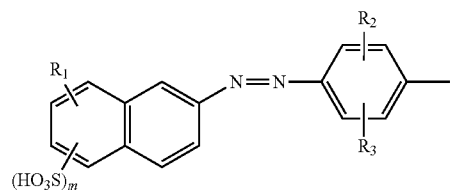

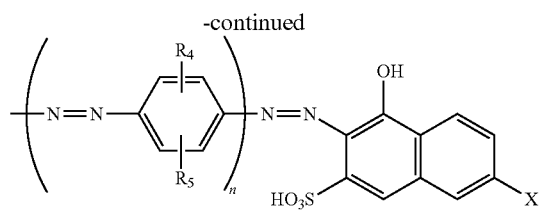

wherein $R_1$ represents a lower alkoxyl group having a sulfone group, $R_2$ to $R_5$ each independently represent a hydrogen atom, a lower alkyl group or a lower alkoxyl group, X is an amino group that may have a substituent, a benzoylamino group that may have a substituent, a phenylamino group that may have a substituent, a phenylazo group that may have a substituent or a naphthotriazole group that may have a substituent, m represents 1 or 2 and n represents 0 or 1.

2. The azo compound and a salt thereof according to claim 1, wherein X is a benzoylamino group that may have a substituent, a phenylamino group that may have a substituent, a phenylazo group that may have a substituent or a naphthotriazole group that may have a substituent, and these substituents are a hydrogen atom, a lower alkyl group, a lower alkoxyl group, a hydroxyl group, a carboxyl group, a sulfone group, an amino group or a substituted amino group.

3. The azo compound and a salt thereof according to claim 1 or 2, wherein X is a phenylamino group represented by Formula (2)

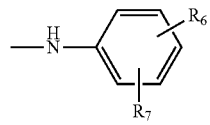

wherein $R_6$ and $R_7$ each independently represent a hydrogen atom, a methyl group, a methoxy group, a sulfone group, an amino group or substituted amino group.

4. The azo compound and a salt thereof according to claim 1 or 2, wherein X is a benzoylamino group represents by Formula (3)

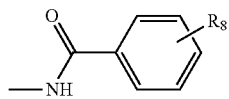

wherein $R_8$ represents a hydrogen atom, a hydroxyl group, an amino group or a substituted amino group.

5. The azo compound and a salt thereof according to claim 1 or 2, wherein X is a naphthotriazole group represents by Formula (4)

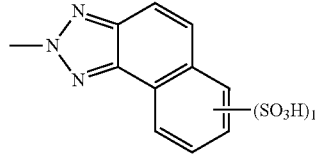

wherein 1 represents 1 or 2.

6. The azo compound and a salt thereof according to claim 1 or 2, wherein X is a phenylazo group represented by Formula (5)

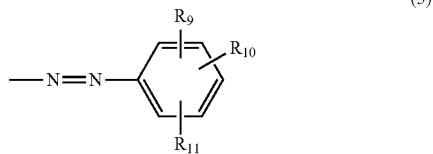

(5)

wherein $R_9$ to $R_{11}$ each independently represent a hydrogen atom, a hydroxyl group, a lower alkyl group, a lower alkoxyl group, an amino group or a substituted amino group.

7. The azo compound and a salt thereof according to claim 1, wherein $R_1$ is a straight chain lower alkoxyl group having a sulfone group.

8. The azo compound and a salt thereof according to claim 1, wherein $R_1$ is a sulfopropoxy group.

9. The azo compound and a salt thereof according to claim 1, wherein $R_2$ to $R_5$ are each independently a hydrogen atom, a methyl group or a methoxy group.

10. A dye-based polarizing film comprising a polarizing film base containing an azo compound and/or a salt thereof according to claim 1.

11. A dye-based polarizing film comprising a polarizing film base containing an azo compound and/or a salt thereof according to claim 1, and at least one organic dye other than the azo compound and/or a salt thereof.

12. A dye-based polarizing film comprising a polarizing film base containing two or more azo compounds and/or salts thereof according to claim 1 and at least one organic dye other than the azo compound and/or a salt thereof.

13. The dye-based polarizing film according to any one of claims 10 to 12, wherein the polarizing film base is a film comprising a polyvinyl alcohol resin or a derivative thereof.

14. A dye-based polarizing plate obtainable by attaching a transparent protecting layer to at least one of surfaces of a dye-based polarizing film according to any one of claims 10 to 12.

15. A polarizing plate for a liquid crystal display comprising a dye-based polarizing film according to claim 13.

16. A polarizing plate for a liquid crystal display comprising a dye-based polarizing plate according to claim 14.

17. A color polarizing film for a liquid crystal projector comprising a dye-based polarizing film according to claim 13.

18. A color polarizing plate for a liquid crystal projector comprising a dye-based polarizing plate according to claim 14.

19. A liquid crystal display device comprising a polarizing film according to claim 15.

20. A liquid crystal display device comprising a polarizing plate according to claim 16.

21. A liquid crystal display device comprising a color polarizing film for a liquid crystal projector according to claim 17.

22. A liquid crystal display device comprising a color polarizing plate for a liquid crystal projector according to claim 18.

* * * * *